(12) United States Patent
Goebels et al.

(10) Patent No.: US 7,841,674 B2
(45) Date of Patent: *Nov. 30, 2010

(54) ABS CONTROL SYSTEM FOR OFF-ROAD DRIVING CONDITIONS

(75) Inventors: Hermann J. Goebels, Sheffield Village, OH (US); Andreas Ziegler, Weissach (DE)

(73) Assignee: Bendrx Commercial Vehicle Systems LLC, Elyria, OH (US)

( * ) Notice: Subject to any disclaimer, the term of this patent is extended or adjusted under 35 U.S.C. 154(b) by 279 days.

This patent is subject to a terminal disclaimer.

(21) Appl. No.: 11/646,679

(22) Filed: Dec. 28, 2006

(65) Prior Publication Data

US 2007/0164606 A1  Jul. 19, 2007

Related U.S. Application Data

(63) Continuation of application No. 10/747,530, filed on Dec. 29, 2003, now Pat. No. 7,159,954.

(51) Int. Cl.
*B60T 8/84* (2006.01)
*B60T 13/00* (2006.01)

(52) U.S. Cl. .................. 303/163; 303/15; 303/147; 303/167

(58) Field of Classification Search ............ 303/3, 303/5, 9.62, 15, 138, 147, 160, 163–167, 303/177, 186, 191, 113.2, 20; 701/71–74, 701/82

See application file for complete search history.

(56) References Cited

U.S. PATENT DOCUMENTS

| | | | |
|---|---|---|---|
| 2,232,447 A | 2/1941 | Griffith | |
| 4,849,891 A | 7/1989 | Krohn et al. | |
| 4,912,744 A * | 3/1990 | Hurst | 303/178 |
| 5,147,115 A * | 9/1992 | Leppek et al. | 303/185 |
| 5,156,444 A * | 10/1992 | Franzke | 303/122.05 |
| 5,253,931 A | 10/1993 | Koster et al. | |
| 5,634,697 A * | 6/1997 | Nishii et al. | 303/116.1 |
| 5,634,699 A | 6/1997 | Ichikawa et al. | |
| 5,719,565 A | 2/1998 | Tsuno et al. | |
| 6,089,680 A | 7/2000 | Yoshioka et al. | |
| 6,272,419 B1 * | 8/2001 | Delplace et al. | 701/72 |
| 6,312,066 B1 | 11/2001 | Gronau et al. | |
| 6,542,805 B1 | 4/2003 | Mergenthaler et al. | |

(Continued)

FOREIGN PATENT DOCUMENTS

JP    2003341500 A   * 12/2003

*Primary Examiner*—Melody M Burch
(74) *Attorney, Agent, or Firm*—Calfee Halter Griswold LLP

(57) ABSTRACT

An electronic brake control device for a wheeled vehicle that operates in a off-road driving mode. The device including one or more inputs for receiving sensor signals to determine wheel speed, wheel retardation, and wheel acceleration, a primary control logic for modulating brake pressure during time periods under normal vehicle operating conditions, a secondary control logic for modulating brake pressure under off-road vehicle operating conditions when the off-road mode is activated, and a processing unit that calculates a vehicle reference speed and a wheel slip of each sensed and antilock brake system controlled wheel, compares the actual vehicle speed to the vehicle reference speed, and calculates at least one of a variable wheel slip threshold and a variable time period for an extended wheel slippage for controlling at least one of the individual wheel slip and the time period for an extended wheel slip.

8 Claims, 6 Drawing Sheets

U.S. PATENT DOCUMENTS

| | | |
|---|---|---|
| 6,640,624 B2 | 11/2003 | Urban et al. |
| 6,792,343 B2 * | 9/2004 | Yasui et al. .................. 701/71 |
| 6,892,123 B2 | 5/2005 | Hac |
| 7,159,954 B2 | 1/2007 | Goebels et al. |
| 2002/0185913 A1 * | 12/2002 | Watanabe ................... 303/139 |
| 2003/0195690 A1 * | 10/2003 | Batistic et al. ................ 701/72 |

* cited by examiner

ABS CONTROL SYSTEM FOR OFF-ROAD DRIVING CONDITIONS

RELATED APPLICATIONS

This is a continuation of U.S. patent application No. 10/747,530 filed Dec. 29, 2003, for ABS CONTROL SYSTEM FOR OFF-ROAD DRIVING CONDITIONS; which issued as U.S. Pat. No. 7,159,954 on Jan. 9, 2007, the entire disclosure of which is fully incorporated herein by reference.

STATEMENT REGARDING FEDERALLY FUNDED RESEARCH

This invention was not made by an agency of the United States Government nor under contract with an agency of the United States Government.

TECHNICAL FIELD OF THE INVENTION

The present invention relates in general to Anti-lock Brake System (ABS), and more specifically to an improved control mode for ABS as applied to vehicles in off-road driving and braking situations.

BACKGROUND OF THE INVENTION

Anti-lock brake systems (ABS) are frequently included as standard equipment on modern vehicles and are currently required on almost all commercial vehicles. The operation of ABS is based on the principle that a skidding wheel (i.e., where the tire contact patch is sliding relative to the road) has less traction than a non-skidding wheel. Thus, by preventing a vehicle's wheels from skidding while the operator is attempting to reduce the speed of the vehicle, anti-lock brakes permit the vehicle to be stopped faster without compromising the operator's ability to steer or otherwise control the vehicle.

Anti-lock brake systems provide rapid, automatic cadence braking in response to signs of incipient wheel locking by alternately increasing and decreasing brake pressure in the brake line(s) of the affected wheel(s) ABS systems typically include speed sensors, a plurality of valves, and an electronic control unit (ECU). The speed sensors which are located on each controlled wheel, provide the ECU with data indicating that one or more of the wheels are about to lock up. A valve is located in the brake line of each brake controlled by the ABS system for releasing brake pressure from the brakes.

Depending on the type of brake system employed, two different methods are used for recovering the brake pressure. In a hydraulically operated brake system, which is typically used in cars, a pump component is included in the system to restore hydraulic pressure to the brake line in which the pressure has been released by a valve. In a pneumatically operated brake system, which is typically used in commercial vehicles, compressed air is taken from an air reservoir that is fed from an air compressor.

The ECU is essentially a computer that monitors the speed sensors at all times and controls the valves. The ECU detects decelerations in the wheels that have fallen below a predefined deceleration range. When the ECU detects rapid wheel deceleration, it (i) reduces the brake pressure to one or more of the brakes until it detects acceleration, and (ii) increases the pressure until it senses deceleration again. The ABS system is capable of performing this function rapidly, before the wheel can lock. The result is that the speed of the ABS controlled wheels is always relatively close to the actual vehicle speed. This aspect of ABS provides optimal stopping and stability performance under dry or slippery road conditions Standard ABS systems are typically optimized for road (i.e., pavement) operation and allow for a minimal braking distance on roads while still providing sufficient cornering force. However, it has been recognized by those skilled in the art that under certain surface conditions anti-lock systems may actually require a longer braking distance than would be the case with continuously locked wheels, especially in the case of off-road surface conditions such as gravel, broken stone, crushed stone, loose ground, mud, high snow, etc. A possible explanation for this effect is that under such off-road conditions, a wedge of surface material is usually formed in front of the locked wheels (i.e., tires), thereby creating changes in the rolling friction value and slowing the vehicle down. Because the normal ABS mode utilizes small or shallow wheel speed cycles, the tire tends to overrun this wedge of material, whereas a locked wheel does not exhibit this tendency. Thus, in contrast to a vehicle's regular ABS mode, where wheel speed is controlled within an optimal slip range in the case of over-braking, the off-road mode includes higher slip rates for deeper wheel cycles with temporary wheel lock-ups that are enforced for the benefit of a shorter stopping distance. However, the disadvantage of an ABS controlled wheel in the off-road mode is reduced or detracted side force and reduced vehicle stability and tractability. Thus, despite the benefit of a shortened braking distance, the result is not necessarily desirable because the vehicle cannot be adequately controlled while its brakes are in a locked state.

Federal performance and equipment requirements for braking systems on vehicles equipped with air brake systems have been established and can be found in Federal Motor Vehicle Safety Standard (FMVSS) 121. FMVSS 121 imposes requirements for stopping distance and curve stability which must be complied with even when a vehicle's ABS system is operating in the off-road mode.

The FMVSS 121 curve stability test requires that a vehicle that drives and brakes within a 500-foot (152 m) radius-curve stay within the 12-foot (3.66 m) range of a slippery curve lane. The initial speed when the vehicle starts braking must be at least 75% of the maximum drive through speed without braking. The adhesion-slip curve between the tires and the road surface dictates that the transferable side force is increasingly affected as the wheel slip increases. The wheel slip is the actual wheel speed in percent below the actual vehicle speed. A non-braking, and therefore free-rolling wheel, has 0% slip, which means vehicle and wheel have the same speed. An over-braked wheel that has reached the slip rate of 100% is completely locked, resulting in reduced transferable side forces. Thus, there is a need for a method for controlling ABS systems in off-road conditions that addresses and overcomes these difficulties.

SUMMARY OF THE INVENTION

These and other limitations of the prior art are overcome by the present invention which provides a system and various associated methods for controlling at least one of the slip threshold and the time period for an extended wheel slippage when a vehicle is operating in the off-road mode. In general, when driving in a curve pattern and/or at high speeds, the individual wheel speeds are controlled with a lower slip threshold and/or shorter time period for the extended wheel slippage than when driving straight ahead and/or at a lower vehicle speed. Advantageously, this brake control system is capable of automatically prioritizing the control balance for greater vehicle stability and tractability and/or optimal stopping distance depending on the driving situation. The system of the present invention involves the implementation and utilization of one or more of several associated exemplary control methods.

In general terms, the basic system logic of the present invention involves the discrete control of the vehicle's individual wheels. Thus, control of the vehicle's ABS system in the off-road mode is accomplished by (i) controlling the individual wheel slip threshold and/or time period for an extended wheel slippage based on the actual vehicle speed; (ii) controlling the individual wheel slip threshold and/or time period for an extended wheel slippage depending on actual lateral acceleration; (iii) using a lateral acceleration sensor to measure actual lateral acceleration; (iv) measuring the actual steering angle with a sensor and controlling the wheel speed cycles in conjunction with the actual vehicle speed; (v) using a yaw rate sensor to determine the deepness and/or time period of the wheel slippage; (vi) controlling the speed of the wheels on either side of the vehicle with different slip thresholds and/or different time periods for the slippage extension; (vii) controlling the individual wheel slip threshold and/or time period for an extended wheel slippage depending on the wheel speed difference of a non-driven axle; and/or (viii) deactivating the off-road mode automatically when the vehicle reaches a predetermined speed.

These methods for controlling the individual wheel cycle behavior based on the driving situation ensures that the wheels of an off-road ABS controlled vehicle will provide adequate side force stability and optimal stopping performance when needed. With the control methods disclosed herein, the synchronization effect of the current state of art off-road ABS control is minimized due to a smooth and constant changing of the wheel slippage of the individually controlled, non-connected wheels.

A primary advantage of this invention is the relatively smooth transition from the regular ABS mode to the deep cycle mode. This discretely controlled changing of the wheel slippage based on vehicle speed provides adequate stability and tractability. The advantage is increased vehicle control when driving in a curve and when driving straight-ahead because in off-road conditions the road surface can change suddenly.

Further advantages of the present invention will become apparent to those of ordinary skill in the art upon reading and understanding the following detailed description of the exemplary embodiments.

BRIEF DESCRIPTION OF THE DRAWINGS

The accompanying drawings, which are incorporated into and form a part of the specification, schematically illustrate one or more exemplary embodiments of the invention and, together with the general description given above and detailed description of exemplary embodiments given below, serve to explain the principles of the invention. The numerical values and ranges expressed in the Figures are illustrative of the various exemplary embodiments and should not be construed in a limiting sense.

DETAILED DESCRIPTION OF THE INVENTION

The present invention provides a system for controlling the ABS system or electronically controlled brake system in a vehicle that is being operated in the "off-road" mode because off road surface conditions are less than optimal for the operation of the ABS system in the regular or normal mode. In general terms, this invention allows the vehicle's ABS system to prioritize or optimize the performance of the system depending on the actual driving situation encountered by the driver. The control mode disclosed herein is optimized for a shorter stopping distance when driving at a lower vehicle speed or driving straight ahead, and provides more transferable side forces when driving at a higher vehicle speed and/or driving in a curve. By diversification of the wheel slippage rate and/or time period for an extended wheel slippage, greater cornering stability is provided over a shorter stopping distance.

I. System, Variables and Calculations

Figure 1:
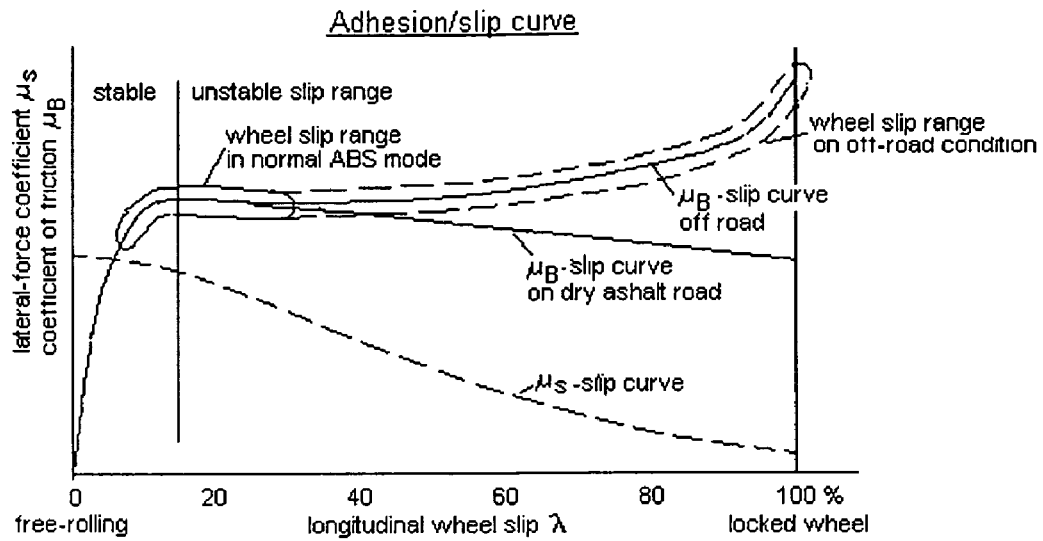
FIG. 1 is a graph depicting the physical relationship of the braking-force coefficient $\mu_B$ and the lateral-force coefficient $\mu_s$ (on y-axis) in dependence on the wheel slip $\lambda$ (on x-axis).

With reference to the Figures, FIG. 1 provides a graph depicting the physical relationship of the braking-force coefficient $\mu_B$ and the lateral-force coefficient $\mu_s$ (both on y-axis) depending on the wheel slip $\lambda$ (on x-axis). In addition to the curves for $\mu_B$ and $\mu_s$ for regular road conditions (i.e., braking on dry asphalt), the curve $\mu_B$ for braking on soft ground in off-road condition is displayed as well. As the curves for the coefficients of braking forces $\mu_B$ and the lateral-force coefficient $\mu_s$ illustrate, the maximum brake force and lateral force can be achieved below a slip rate of approximately 15%, when braking on regular road conditions as shown for dry asphalt. The circled area with the dashed lines identifies when ABS is exercising its closed-loop control in the regular ABS mode to achieve optimum brake performance and stability. Optimal brake performance in off-road conditions is achieved when braking with locked wheels ($\lambda$=100%), but the side force (responsible for stability) is also reduced to a minimum. As a compromise for acceptable stopping distance and stability, the ABS in off-road mode is exercising its closed loop control within the slip rate from regular ABS up to 100%. The circled area with the solid lines shows the extended slip rate when the off-road ABS mode is selected.

Figure 2:
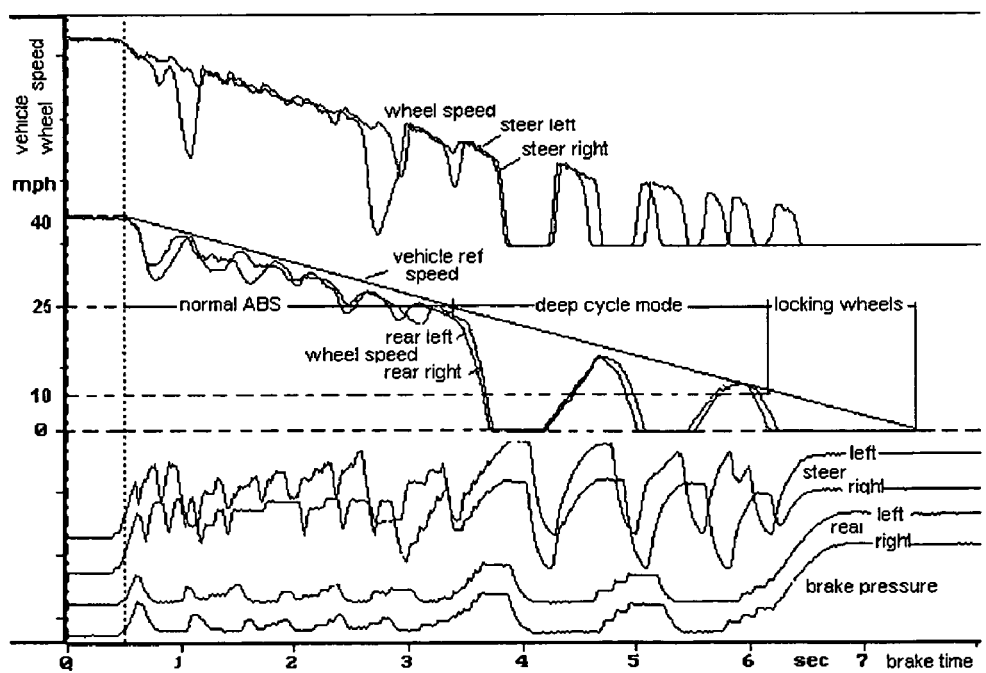
FIG. 2 is a graphical presentation of a data set illustrating the prior art method of controlling a four-wheel vehicle when the ABS off-road mode has been selected.

As shown by the measured function traces in FIG. 2, the wheel lock-ups occurring in the off-road mode of current ABS systems happen mostly simultaneously, resulting in a dramatic decrease in vehicle stability and control. FIG. 2 presents a data set collected from an actual ABS event wherein a two-axle, air-braked vehicle was operated in the off-road mode of the prior art. The traces indicate the vehicle speed, the wheel speed and the corresponding brake chamber pressure. Prior art ABS systems operating in the off-road mode function as follows: the regular/normal ABS mode is operational when vehicle speed is above 25 mph, the deep wheel cycle mode with selective wheel lock-ups occurs within a vehicle speed from about 25 to 10 mph, and the locking wheel mode is active when vehicle speed is about 10 to 0 mph. In the regular/normal ABS mode, the ECU controls the wheel speed in an ABS event within a lower wheel slip range to optimize the brake performance for stopping distance and side stability. This regular ABS wheel slip range is circled in FIG. 1. The vehicle speed range above 25 mph in FIG. 2 shows the related wheel speed behavior as controlled in regular ABS mode.

To enforce deep wheel cycles when the vehicle reaches the speed range of about 25 to 10 mph, the wheel speed is controlled within a higher slip rate. This is achieved by extended brake pressure build-up phases with a slip threshold above the regular control. When the wheel speed reaches the 100% slip rate, which is the lock up situation, pressure stays in hold for an additional time of about 200 milliseconds before the pressure is released to return the wheel speed to close to the vehicle reference speed. Due to the control algorithm currently used to enforce the wheel speed cycle, and regardless of the fact that all wheels are individually controlled, all wheels typically reach deep speed cycles more or less at the same time. The result of this simultaneous actuation is that the wheels experience little or no side stability. This situation is shown in FIG. 2 within the vehicle speed range of 25 to 10 mph. As previously stated, prior art system logic results in a substantially synchronized deep wheel cycle mode, and the side force is largely reduced and the vehicle stability and tractability are significantly affected.

Figure 3:
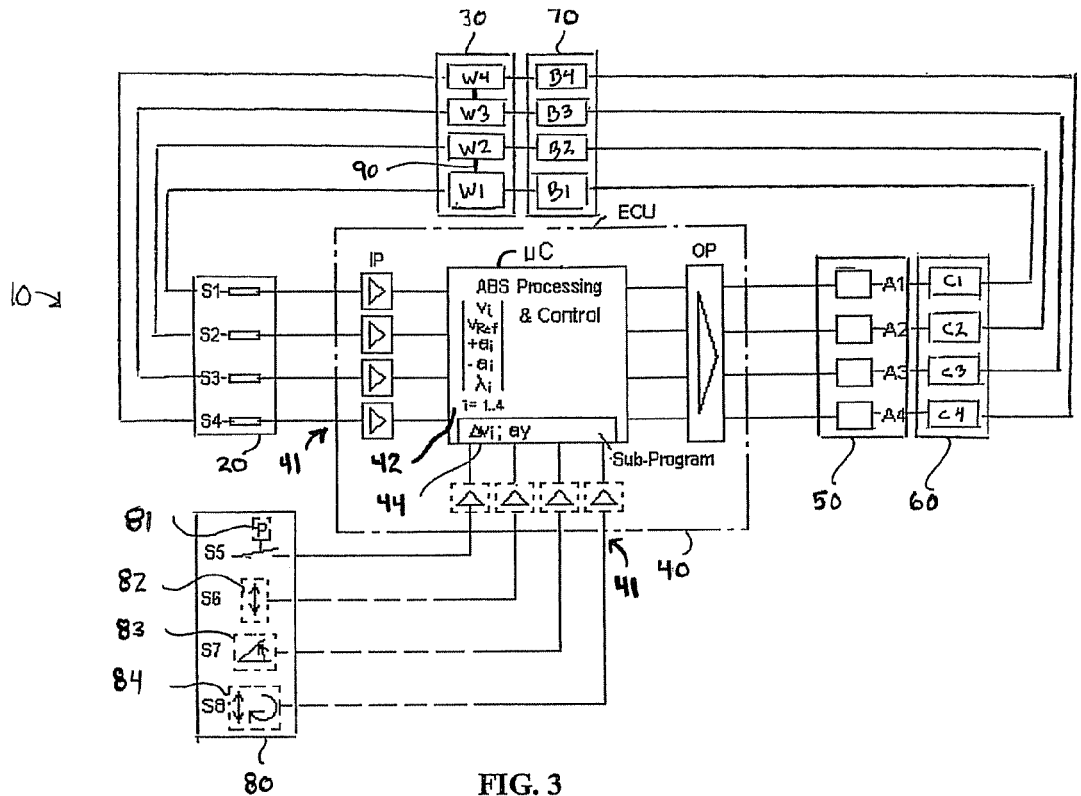
FIG. 3 is a block diagram showing the basic components of an anti-lock braking system compatible with the control methods of the present invention.

FIG. 3 depicts in a simplified block circuit diagram the primary components of an anti-lock braking system 10 for implementing the control methods of the present invention. System 10 includes wheel speed sensors 20 (S1-4) on the ABS-controlled wheels 30, an Electronic Control Unit (ECU) 40, which has one or more inputs 41 for receiving signals from a plurality of sensors and is typically located in the cab or mounted to the frame of the vehicle, and pressure control valves 50 (A1-4), located near the brake chambers 60 (C1-C4) of the brakes 70 (B1-B4). The wheel speed sensors 20 monitor the wheel rotation and communicate proportional wheel speed signals and changes in the input stages (IP) to ECU 40 in a digitized format.

The microcomputer (μC) interprets the digitized wheel speed signals and calculates wheel speed Vi, and acceleration signals $-a_i$ and $+a_i$ are built individually for each sensed wheel. A reference speed $V_{ref}$ is created by logically combining the individual wheel speeds $V_i$, thereby approximating actual vehicle speed. By comparing the measured wheel speed $V_i$ to the calculated vehicle reference speed ($V_{ref}$) a slip rate $\lambda$1-4 is built by the formula $\lambda_i=((V_{ref}-V_i)/V_{ref})*100$, which represents in percent the actual wheel speed $V_i$ below the actual vehicle reference speed $V_{ref}$. By processing data according to a known ABS control algorithm, and by evaluating of all available measured and derived data from each individual wheel, braking pressure control signals are generated and sent from an output stage (OP) to the pressure control valves A1-4.

In accordance with the present invention, microcomputer μC includes, in addition to the regular ABS control algorithm (i.e. primary control logic 42), a sub-program (i.e. secondary control logic 44) that generates lateral acceleration data by comparing speed differences between non-driven wheels (on non-driven axle 90) and non-braked wheels and/or analyzing data gathered from additional sensors 80 (S5-8) (see FIG. 3). These sensors may include a stop light switch 81 (S5), a lateral acceleration sensor 82 (S6), a steering angle sensor 83 (S7), and/or a yaw rate sensor 84 (S8). Sensor 81 (S5) provides information when the brake is applied. This information is typically available also on the SAE J1939 data bus and can be used instead the reading of the stop light switch input. SAE J1939 is a high-speed data communication link for data exchange between the electronic units on board of a vehicle.

The data measured by sensors S5-8 and/or derived from the speed differential $\Delta V$ of the non-driven wheels are processed in the sub-program of the microcomputer μC to generate the actual lateral acceleration and/or the driving direction. With actual lateral acceleration and/or driving direction determined by the sub-program, wheel slippage can be controlled in a different manner when driving in a curve versus driving in a straight direction. Lateral acceleration may be calculated in different ways, depending on the sensors installed in the vehicle (see FIG. 3). If a lateral acceleration sensor S6 is installed, the lateral acceleration may be derived directly from the sensor input as measured by S6.

If a steering angle sensor S7 is used to measure the actual steering angle and then uses this input to indirectly calculate the angle of the steering wheels relative to the longitudinal axis of the vehicle, the actual curve radius (r) and curve driving direction can be determined and the actual lateral acceleration ay is calculated as: ay=Vref²/r.

If a yaw rate sensor S8 is used to measure the yaw rate (wz), lateral acceleration (ay) may be calculated as: ay=wz*(Vref), where Vref is the vehicle reference speed.

For stationary driving through a curve (e.g., the 500 ft-radius test per FMVSS121), the lateral acceleration (ay) may be calculated by using the wheel speed difference $\Delta V$ of the non driven wheels as follows: ay=Vref*(v_fl−v_fr)/b, where $V_{ref}$ is the vehicle reference speed, v_fl is the wheel speed front left, v_fr is the wheel speed front right and b is the wheel track width of the front axle. The wheel speed of a non-driven axle could also be used for this calculation as well. With the lateral acceleration (ay), curve radius r can be calculated as follows: r=Vref²/ay. Substitution of ay leads to: r=Vref*b/(v_fl−v_fr). The advantage of this method is that no additional sensor is needed. This calculation of lateral acceleration and curve radius is compatible with free rolling, non-braked wheels. This situation is, in principal, given at the beginning of the stability test required by FMVSS 121. Braking starts after the vehicle has reached a stationary curve-driving situation; thus at the beginning of this stability test, before the brake pressure is applied, the actual lateral acceleration and actual curve radius can be calculated by using the ΔV data of the front axle wheels shortly before braking starts. The ABS ECU can detect the activation of the brake by reading in stop light switch S5 as a direct input or via data link. During braking, the acceleration is not calculated from the wheels speeds. However, assuming a constant radius (as required by FMVSS 121), lateral acceleration (ay) can be extrapolated from the vehicle reference speed and the curve radius calculated before brake application as follows: ay_est=Vref$^2$/r, where ay_est is the extrapolated lateral acceleration (ay) during the brake maneuver and r is the curve radius calculated shortly before brake application.

Figure 9:
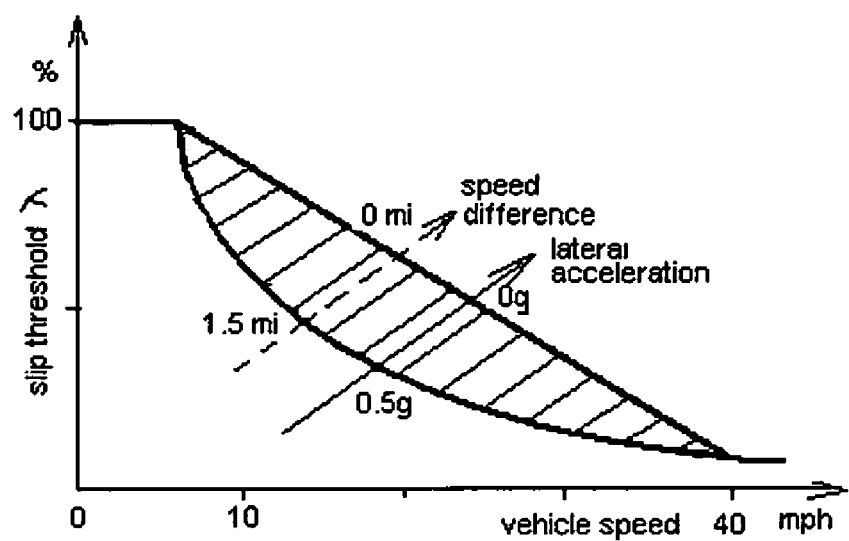
FIG. 9 is a graphical representation of the relationship between the slip threshold $\lambda$ and the vehicle reference speed in combination with the lateral acceleration or wheel speed differential of a non-driven axle.
Figure 10:
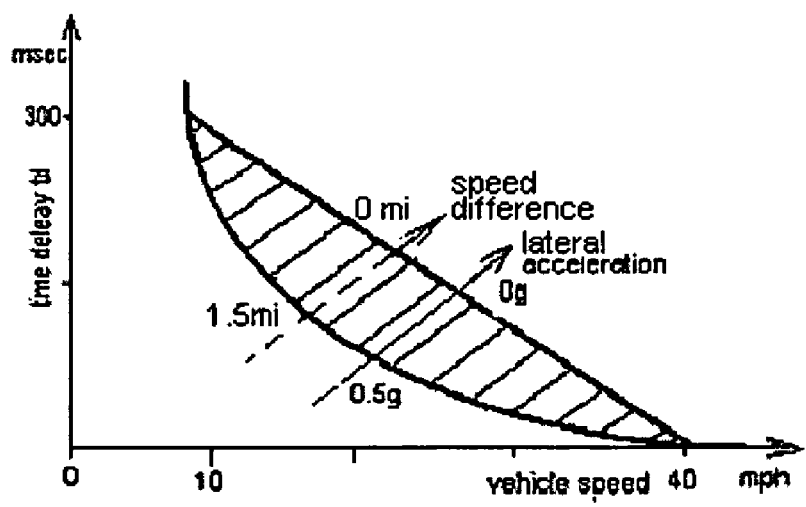
FIG. 10 is a graphical representation of the relation between the time delay period for the extended wheel slippage control and the vehicle reference speed in combination with lateral acceleration or wheel speed difference of a non-driven axle.

Alternately, instead of using the speed differential ΔV of the non-driven wheels of an axle for the calculating of the lateral acceleration, the speed differential ΔV itself as measured when driving in a curve can be used for determining the variation of the slip threshold λ and/or time delay td (see FIGS. 9 and 10).

Figure 4:
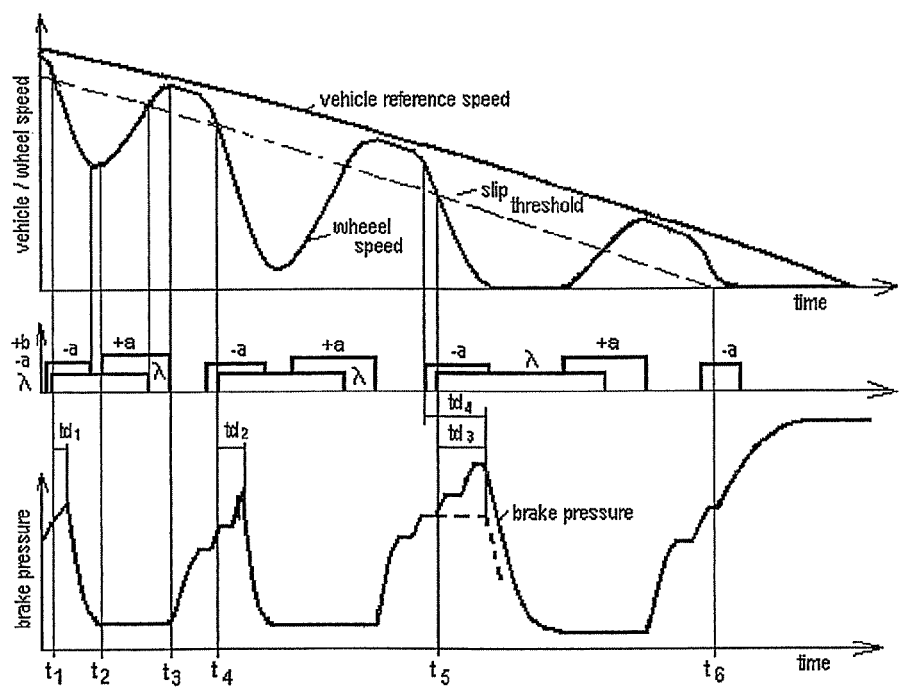
FIG. 4 is a schematic diagram illustrating wheel speed, the corresponding logical signals and the brake pressure drawn relative to a time scale and according to the logic of system of the present invention.

FIG. 4 presents ABS system data in accordance with the system of the present invention. For the purpose of simplifying the explanation of the control logic, only one wheel is displayed where wheel speed is controlled according this system. FIG. 4 illustrates the wheel speed $V_i$ of the ABS controlled wheel, vehicle reference speed $V_{ref}$, and the brake chamber pressure of the wheel. On bottom side of this diagram, the logical signals of wheel retardation −a, wheel acceleration +a, and wheel slip λ are displayed in a dedicated time scale relative to the wheel speed and brake pressure on the appropriate wheel.

As stated previously, vehicle reference speed ($V_{ref}$), which is the closest estimate of the true vehicle speed, is built internally into the ECU by the logical combination of wheel speeds and is used to calculate the individual wheel slip λ. The slip threshold λ is depicted as a dotted line and is changing the slip rate to a higher percentage with lower vehicle speed in order to extend the wheel slippage rate as one of the options of this invention. The slip threshold λ, for example, is at the time $t_1$ approximately 12% and reaches at the time $t_7$ 100%. As a second option for extending the wheel slippage depending on vehicle speed is depicted with the delay time $t_d$ for pressure release. The time $t_d$ can be a constant time delay, or as shown here, an increasing time delay with lower speed.

Again with reference to FIG. 4, controlling the wheel speed as one embodiment of this invention operates as follows: At time $t_1$ the wheel speed has reached the slip threshold λ which occurs here, coincidentally, shortly after the time that the wheel deceleration threshold −a is achieved. However, in this case the threshold −a is only relevant for the start of pressure release in a regular ABS control. For an additional time $td_1$, the pressure is still increasing to enforce a deeper wheel speed cycles than would occur in a regular ABS control. After time $td_1$ the pressure is released until a positive wheel acceleration +a appears at time $t_2$ indicating that the wheel speed is starting to recover. The brake pressure is held until the wheel speed is recovered and is close to the vehicle speed as indicated by the disappearance of +a at time $t_3$. Pressure can now be increased again until the slip threshold λ is reached again at time $t_4$ and the time $td_2$ is completed.

The next wheel speed cycle is controlled in the manner previously described. In the following wheel speed cycle, the wheel speed reaches 100% slip enforced with the higher slip rate and the extended time delay $td_3$ indicating the volitional wheel lock up. The following pressure-hold and build-up is controlled in the same manner again as described before. However, this time, when the vehicle speed has fallen to a certain speed, the slip threshold λ is set to 100% as shown at time t6. The brake pressure now builds up rapidly in response to the driver's demand and all wheels lock up until the end of the braking maneuver.

With the dependence of the slip threshold λ and/or extended time delay (td) for pressure release on the vehicle speed, the wheel slippage is controlled based on the driving situation. When driving at a higher speed, the wheel slippage is controlled with fewer deeper wheel cycles, thereby providing greater stability and tractability. When driving at a lower speed, wheel slippage is controlled with a higher wheel slippage, thereby providing a better stopping performance.

The combination of slip threshold λ and time delay (td) is just one method associated with the system of the present invention for controlling wheel slippage based on vehicle speed. In an alternate embodiment, the extended wheel slippage in the off-road mode is controlled based only on slip. In this case, brake pressure builds up until the slip threshold λ appears followed by the pressure release from this time. The control of wheel slippage may also be based on the time factor alone. In this case, the time delay (td) for pressure release starts with the appearance the −a threshold for the regular ABS control instead to the λ threshold (see FIG. 4: time $td_4$ in time area of $t_5$).

Another example of control with the extended time delay (td) is shown at the time t5; by building more pressure when the wheel acceleration threshold −a or the slip threshold λ is reached, a pressure hold for the time delay (td) is also possible. With the appearance of −a and/or λ the wheel slip is already in an unstable range and the wheel speed will slow down regardless of pressure built or pressure held. The interrupted pressure curve at time t5 shows this possibility with the pressure hold instead of further build up.

Figure 5:
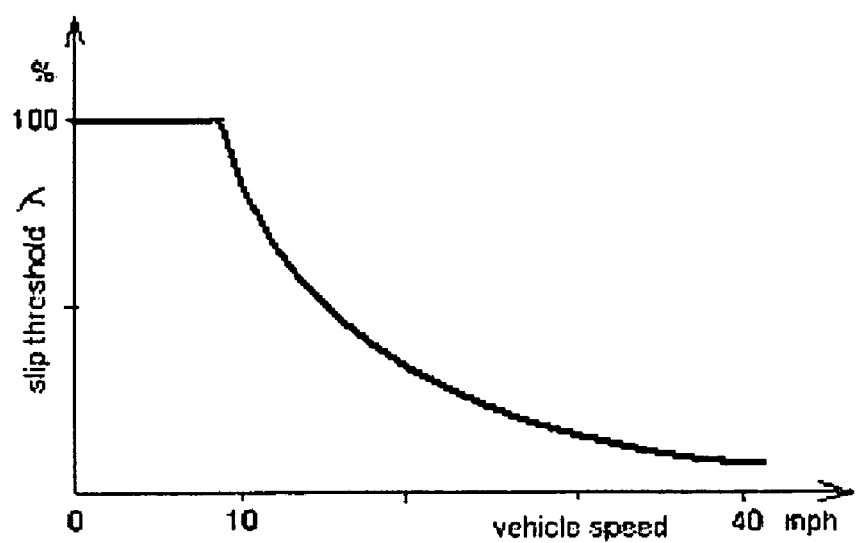
FIG. 5 is a graphical representation of the relationship between the slip threshold and the vehicle reference speed in accordance with the present invention.

FIG. 5 illustrates how the slip threshold λ is varied with the vehicle speed in accordance with the control methods of present invention. In FIG. 5, the slip threshold λ (in percent) is changing in a progressive manner relative to the vehicle speed (on x-axis). At the vehicle speed of about 50 mph, the slip threshold starts with the value of the regular ABS control and increases progressively to 100% when the vehicle speed has reached 10 mph. Here, the braking system operates in the regular/normal ABS mode above 40 mph, and from 40 to 10 mph with an increasing wheel slippage, and from 10 mph with a 100% slip threshold and as a consequence of locking wheels. The progressive the change of the slip threshold relative to the vehicle reference speed may also be accomplished in a linear manner.

Figure 6:
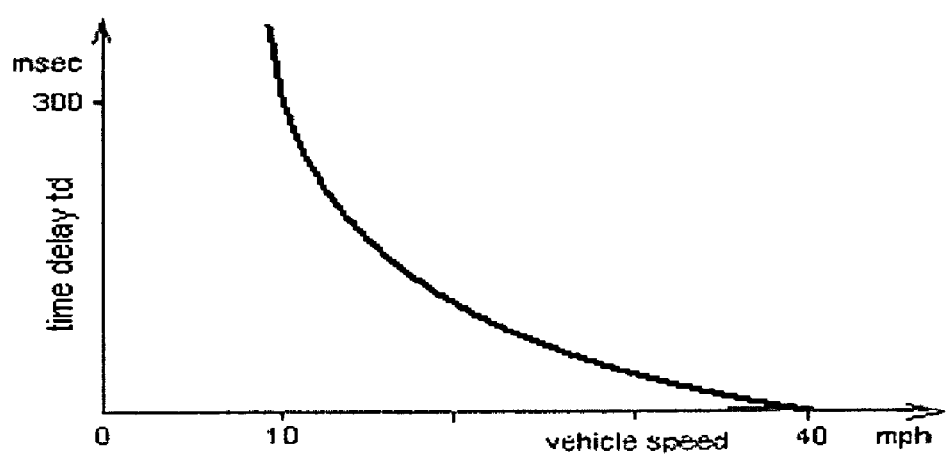
FIG. 6 is a graphical representation of relationship between vehicle reference speed and the time required for extended wheel slippage control in accordance with the present invention.

FIG. 6 illustrates the change of the time period for an extended wheel slippage when controlled in the off road ABS mode. The time period (shown on the y-axis) has a similar correlation to the vehicle speed (shown on x-axis) as illustrated in FIG. 5 with the wheel slip rate λ. The time period for the delay of pressure release starts with 0 when the vehicle speed is about 40 mph and increases progressive with lower speed to a maximum of 300 milliseconds, for example, when the wheels are forced to lock completely when the vehicle speed reaches 10 mph. Here a linear characteristic is possible too. If the extended wheel slippage is enforced by only the time delay (td) for pressure release, and independent from a slip rate λ, the time period will be connected to the acceleration threshold −a as shown and explained in FIG. 4.

The time-related wheel slippage shown in FIG. 5 will control the ABS in a regular mode above 40 mph and smoothly switch over to locking wheels at the vehicle speed of 10 mph. As already mentioned in the description of FIG. 4, the extended wheel slippage can be controlled in different ways. In summary, extended wheel slippage can be controlled (i)

based on vehicle speed with a variable slip rate λ as shown in FIG. 5 (ii) with a time related wheel slippage extension only, as shown in FIG. 6; and with a combination of λ and time delay as illustrated in FIG. 4.

Figure 7:
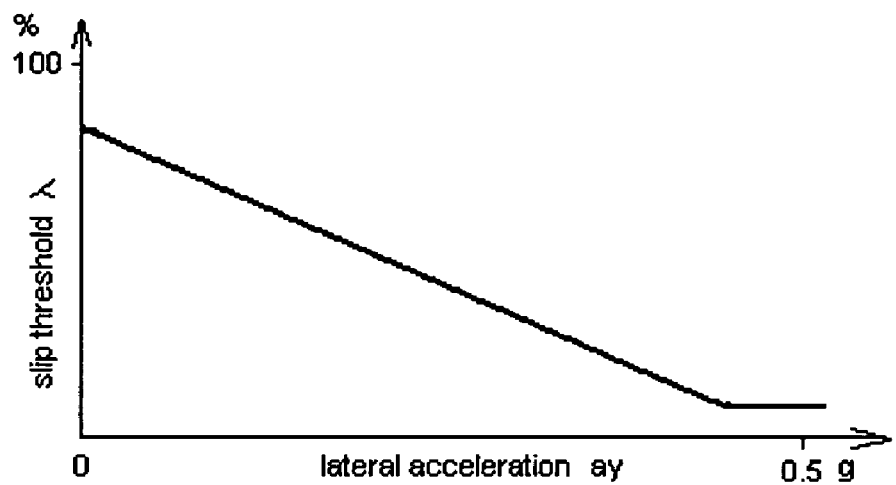
FIG. 7 is a graphical representation of the relationship between slip rate $\lambda$ and lateral acceleration in accordance with the present invention.
Figure 8:
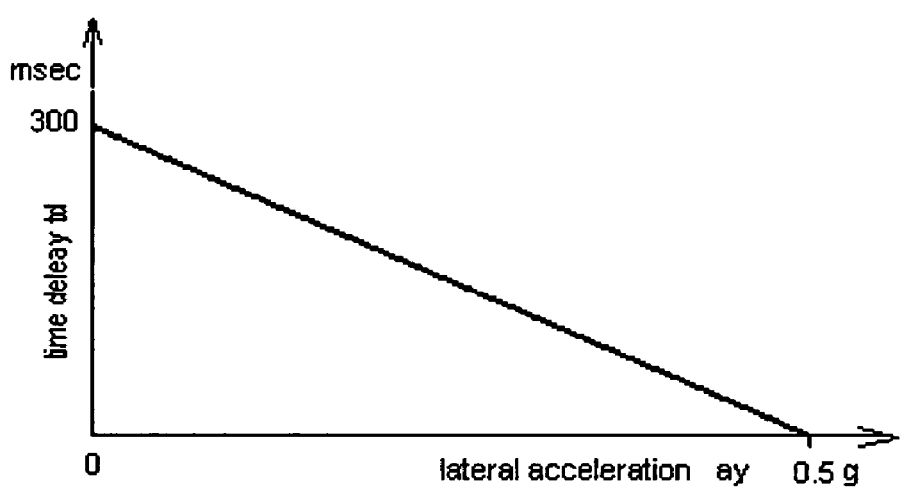
FIG. 8 is a graphical representation of the relationship between the time delay period for extended wheel slippage control and lateral acceleration in accordance with the present invention.

With reference to FIG. 7, in addition to the possibility of controlling wheel slip based on vehicle speed, wheel slip can also be controlled based on the lateral acceleration (ay). The actual wheel slip can be controlled either by a variation of the slip rate λ as already depicted in FIG. 5 or by a variation of the delay time (td) as shown in FIG. 6 or both by varying slip rate and delay time, always based on the lateral acceleration (ay). FIG. 7 shows an example of the dependent relationship between slip rate λ and lateral acceleration (ay). FIG. 8 shows one example of the dependent relationship between the time delay for pressure release and lateral acceleration (ay).

FIG. 9 illustrates the change of the slip threshold λ (on y-axis) in conjunction with the vehicle reference speed (on x-axis) and lateral acceleration as an additional variant. On this graph, 0 g (g standing for acceleration of gravity) depicts a straight driving situation with no centrifugal force and the graph 0.5 g depicts the situation when driving in a narrow curve with a constant centrifugal force of 0.5 g. The dependency of the slip threshold λ to the vehicle reference speed (with 0 g) is linear providing a further possible example of the progressive behavior as depicted in FIG. 5. The hatched area in this Figure indicates the dependency of the actual slip threshold on the actual reference speed and the actual lateral acceleration. As already explained in the description relating to FIG. 3, the speed differential ΔV as actual measured by two of the wheel speed sensors A1-4 of a non driven axle and in a non-braking situation may be used directly for the variation of the slip threshold λ in conjunction with the actual vehicle speed $V_{ref}$. This option is depicted with an arrow in a dotted line (FIG. 9).

FIG. 10. illustrates the correlation of the time period for an extended wheel slippage (on y-axis) to the vehicle reference speed and in addition to the lateral acceleration in the same manner as the slip threshold in FIG. 9. Also, the dependency of time delay on the vehicle reference speed is shown as being linear, with no lateral acceleration (0 g) depicted in a straight driving situation and reaching a progressive behavior with a lateral acceleration of 0.5 g. The hatched area in this Figure indicates the dependency of the actual time delay for the extended wheel slippage control on the reference speed and the actual lateral acceleration. The arrow in a dotted line shows the variation of the time delay (td) depending on the reference speed and the wheel speed difference as an alternative to the lateral acceleration.

Figure 11:
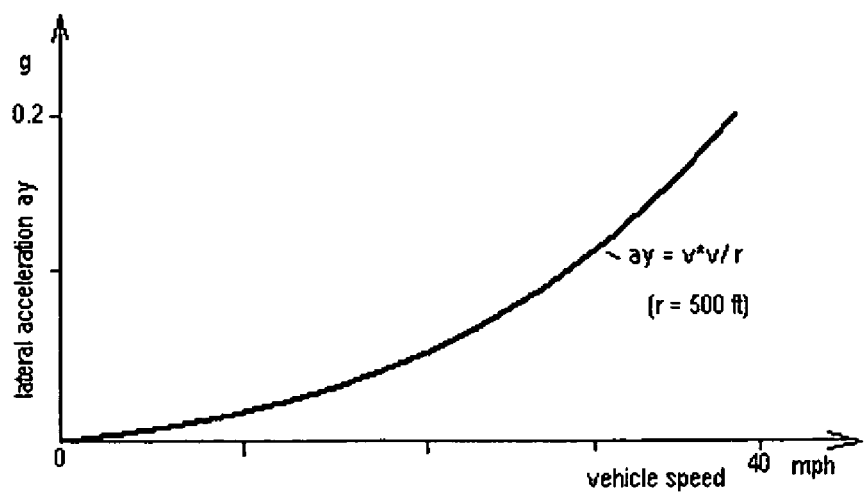
FIG. 11 is a graphical representation of the relationship between actual lateral acceleration and vehicle speed when driving and braking within a 500-ft radius curve.

FIG. 11 presents graphically the actual lateral acceleration (ay) depending on vehicle speed when driving and braking in a 500 ft-radius curve. As already described in FIG. 3, the actual lateral acceleration in the 500 ft-radius curve can be extrapolated from the curve radius (r) as calculated before the brake is applied and the actual vehicle reference speed $V_{ref}$. As the radius (r) in the 500 ft-radius curve test is constant, the actual lateral acceleration can be estimated by the formula $ay_{est}=V_{ref}^2/r$. This estimation of the actual lateral acceleration is made based the actual vehicle reference speed and with assumption that the curve radius will be constant during the braking event.

Figure 12:
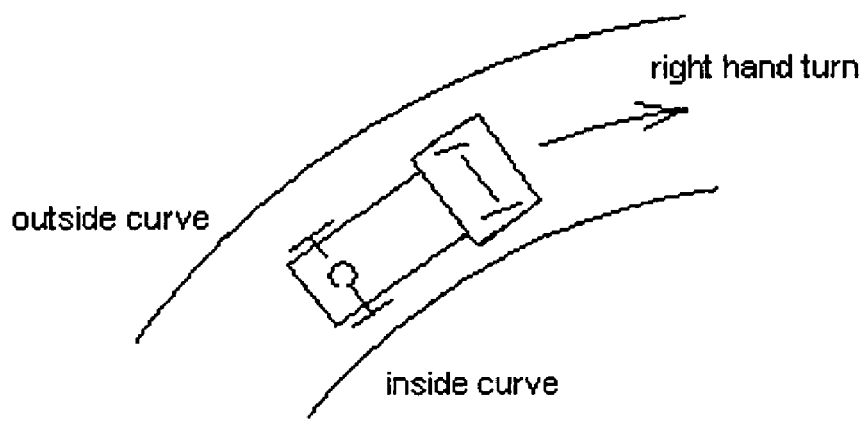
FIG. 12 depicts a control method associated with the system of the present invention wherein the wheels of two axles are controlled in a sidewise configuration when the vehicle is being driven in a curve.

FIG. 12 illustrates a driving situation in a curve. By detecting the direction of the curve, it is possible to control the outside curve wheels with wheel speed slippage that is different from than that of the inside curve wheels. In a right side curve, the right side wheels are controlled with deeper wheel cycles than the left side wheel. Because of the dynamic load shifting effect to the outside wheels more stability can be provided if the outside wheels are controlled with a smaller with slippage value and/or a shorter time period for the delay of the pressure release. The direction of the curve can be derived from the lateral acceleration (ay). A positive value of (ay) indicates a right hand turn, a negative value indicates a left hand turn. If the vehicle is equipped with a steering angle sensor S6, the direction of driving can be derived directly from the sensor input.

II. Control Methods

A first exemplary method for controlling the brakes of a vehicle, when the brakes are controlled by an anti-lock brake system or an electronically controlled brake system and the anti-lock brake system is operating in the off-road mode, includes the following steps. A plurality of sensors is used to generate signals that are used by an electronic control device to determine wheel speed, wheel retardation, and wheel acceleration. The control device further includes a standard or primary control logic for modulating brake pressure during time periods under normal vehicle operating conditions, and a secondary or special control logic for modulating brake pressure under off-road vehicle operating conditions when the off-road mode has been activated. The control device is used to calculate a vehicle reference speed and a wheel slip of each sensed and ABS controlled wheel, and to control the individual wheel slip and/or time period for an extended wheel slip by comparing the actual speed of the vehicle to the reference speed and calculating a variable wheel slip threshold and/or a variable time period for extended wheel slippage. Faster driving controls the wheel speed in fewer deeper and/or shorter cycles than slower driving, thereby enhancing cornering stability and tractability when driving in a curve at a higher speed while the vehicle is experiencing a higher centrifugal force.

The variable slip threshold and/or the variable time period for an extended wheel slippage may also be determined by the secondary control logic by progressively changing to higher values based on the vehicle's speed or a combination of vehicle speed and lateral acceleration. The secondary control logic may also be set for an extended wheel slippage such that the extended wheel slippage becomes effective only below a predetermined vehicle reference speed of, for example, within the range of about 40 mph to 30 mph. The secondary control logic may also be set to transition between normal operation and an extended wheel slippage or deeper wheel slippage in an uninterrupted or continuous manner.

This method may also include the steps of (a) instructing the control device to execute a series of brake pressure build-up phases in the chambers of the brakes in response to the driver's braking demands when the vehicle reference speed is about 10 mph, or (b) calculating the variable slip threshold and/or variable time period for an extended wheel slippage progressively or linearly dependent on the vehicle reference speed.

A second exemplary method for controlling the brakes of a vehicle, when the brakes are controlled by an anti-lock brake system or an electronically controlled brake system and the anti-lock brake system is operating in the off-road mode, includes the following steps. A plurality of sensors is used to generate signals for use by an electronic control device in determining wheel speed, wheel retardation, and wheel acceleration. The control device further includes a standard or primary control logic for modulating brake pressure during time periods under normal vehicle operating conditions, and a secondary or special control logic for modulating brake pressure under off-road vehicle operating conditions when the off-road mode has been activated. The control device is used to calculate a vehicle reference speed and a wheel slip of each sensed and ABS controlled wheel, and to control the individual wheel slip and/or time period for an extended wheel slip by comparing the actual speed of the vehicle to the reference speed and controlling the individual wheel slip and/or time period for an extended wheel slippage based on the vehicle's actual lateral acceleration. Faster driving in a curve or driving in a narrow curve results in a higher lateral acceleration and requires more cornering forces. Therefore, the wheel speed is controlled with less deep and/or shorter wheel slippage during increased lateral acceleration.

The variable slip threshold and/or the variable time period for an extended wheel slippage may be determined by the secondary control logic by progressively changing to higher values based on the vehicle lateral acceleration or a combination of vehicle speed and lateral acceleration. The variable slip threshold and/or the variable time period for an extended wheel slippage may be progressively or linearly dependent on the vehicle lateral acceleration.

This method may also include the step of calculating vehicle lateral acceleration when the vehicle is taking a curve by measuring the speed of the wheels on the inside of the curve and the speed of the wheels on the outside of the curve and determining the speed difference ($\Delta V$) of the non-driven wheels as measured by the sensors and calculating lateral acceleration based on the vehicle reference speed and the wheel track width of the vehicle's non-driven axle.

Lateral acceleration may also be calculated based on wheel speed sensor input from a non-driven axle and during a non-braking situation. The non-braking situation may be monitored by a stop light switch and/or by data link. The actual lateral acceleration may be calculated just before the brakes are applied or simultaneous with the appearance of the stop light switch information. The actual lateral acceleration when driving and braking in a curve may be extrapolated from the curve radius, which may be calculated just before or simultaneous with the appearance of the stop light switch information and may be based on the sloping vehicle reference speed while braking in a curve.

A third exemplary method for controlling the slip threshold and/or the time period for an extended wheel slippage when a vehicle is operating in the off-road ABS mode includes the steps of using a lateral acceleration sensor to measure actual lateral acceleration and controlling the slip threshold and/or the time period for an extended wheel slippage in conjunction with the actual measured lateral acceleration.

A fourth exemplary method for controlling the slip threshold and/or the time period for an extended wheel slippage when a vehicle is operating in the off-road ABS mode includes the steps of measuring the actual steering angle with a sensor and controlling the wheel speed cycles in conjunction with the actual vehicle speed and the actual steering wheel angle.

A fifth exemplary method for controlling the slip threshold and/or the time period for an extended wheel slippage when a vehicle is operating in the off-road ABS mode includes the steps of using a yaw rate sensor and the actual lateral acceleration and comparing the actual yaw rate and the vehicle reference speed. The output of a yaw rate sensor is used to determine the deepness and/or time period of the wheel slippage. Using this sensor, which indicates the vehicle's position relative to the driving direction, the wheel speed can be controlled for greater stability when negotiating curves and lane changes.

A sixth exemplary method for controlling the slip threshold and/or the time period for an extended wheel slippage when a vehicle is operating in the off-road ABS mode includes the steps of controlling the speed of the wheels on either side of the vehicle with different slip thresholds and/or different time periods for the slippage extension by gathering data from a stop light switch, a lateral acceleration sensor, a steering angle sensor, and a yaw rate sensor, and/or comparing the wheel speed difference from the curve outside to the curve inside wheel to determine the vehicle driving directing.

A seventh exemplary method for controlling the brakes of a vehicle, when the brakes are controlled by an anti-lock brake system or an electronically controlled brake system and the anti-lock brake system is operating in the off-road mode, includes the following steps. A plurality of sensors is used to generate signals for use by an electronic control device in determining wheel speed, wheel retardation, and wheel acceleration. The control device further includes a standard control logic for modulating brake pressure during time periods under normal vehicle operating conditions, and a secondary control logic for modulating brake pressure under off-road vehicle operating conditions when the off-road mode has been activated. The control device is used to calculate a vehicle reference speed and a wheel slip of each sensed and ABS controlled wheel and to control the individual wheel slip and/or time period for an extended wheel slippage based on the actual difference in speed of the wheels on a non-driven axle.

The variable slip threshold and/or the variable time period for an extended wheel slippage may be determined by the secondary control logic by progressively changing to higher values based on the wheel speed difference or a combination of vehicle speed and wheel speed difference.

This method may further include the step of measuring the speed of the wheels on the inside of a curve and the speed of the wheels on the outside of a curve and determining the speed difference ($\Delta V$) as measured by the wheel speed sensors of a non-driven axle when the vehicle is taking a curve. The speed difference may be based on wheel speed sensor input from a non-driven axle and during a non-braking situation and the non-braking situation may be monitored by a stop light switch and/or by data link. The speed difference may be estimated just before the brakes are applied or measured simultaneous with the appearance of the stop light switch information.

Using this method, the speed of the wheels on either side of the vehicle is controlled using different slip thresholds and/or different time periods for the slippage extension depending on the direction at which the vehicle enters a curve. Due to the effect of centrifugal force, the partial weight of the dynamic load is transferred to the outside wheels when driving in a curve; thus, the outside wheels are controlled with a lower slip threshold and/or shorter time period for extended wheel slippage compared to the inside wheels. With more weight on the outside wheels, and enhanced stability, more side force can be transferred to the road.

An eighth exemplary method of controlling the brakes of a vehicle, wherein the brakes are controlled by an anti-lock brake system and wherein the anti-lock brake system is operating in the off-road mode, the method includes the step of deactivating the off-road mode automatically when the vehicle reaches a predetermined speed.

The methods of controlling the vehicle brakes as described in the present invention brakes when the vehicle is operating in the off road mode is not limited to an Anti-lock Braking system (ABS) only. This method can be used in an electronically controlled Brake System (ECBS) as well. ECBS controls a brake system by using electronic signals to control and operate the brake system, not only in an ABS event, but also during normal braking. As ABS is a part of ECBS, the enhanced control of the present invention is compatible with ECBS systems as well.

Activation of the off road ABS (or ECBS) control mode can be accomplished known methods such as by using an electrical switch to provide a momentary or permanent ground signal to the ECU. Also, deactivating of the off-road mode can done with an electrical switch or the mode may automatically be switched back to the regular mode with the next electrical power activation when the ignition key is switched from the non-operating to the operating position. The vehicle speed itself could be used to deactivate the off-road mode when, for example, the vehicle speed has reached a certain speed and the driver can activate it again by pushing the electrical switch.

While the above description contains much specificity, this should not be construed as a limitation on the scope of the invention, but rather as exemplification of certain preferred or exemplary embodiments. Numerous other variations of the present invention are possible, and is not intended herein to mention all of the possible equivalent forms or ramifications of this invention. Various changes may be made to the present invention without departing from the scope or spirit of the invention.

What is claimed:

1. An electronic control device for controlling the brakes of a wheeled vehicle, wherein said brakes are controlled by an anti-lock brake system and wherein said anti-lock brake system, includes a normal driving conditions mode and an off-road driving conditions mode, and wherein said brake system is operating in the off-road driving conditions mode, comprising:
    (a) one or more inputs for receiving signals from a plurality of sensors for use by said electronic control device to determine wheel speed, wheel retardation, and wheel acceleration;
    (b) a primary control logic for modulating brake pressure during time periods under normal vehicle operating conditions;
    (c) a secondary control logic for modulating brake pressure under off-road vehicle operating conditions when the off-road mode has been activated; and
    (d) a processing unit that calculates a vehicle reference speed and a wheel slip of each sensed and anti-lock brake system controlled wheel,
    wherein said processing unit compares the actual speed of the vehicle to said vehicle reference speed, calculates at least one of a variable wheel slip threshold and a variable time period for an extended wheel slippage and controls at least one of the individual wheel slip and the time period for an extended wheel slip.

2. The control device of claim 1 wherein said processing unit progressively changes at least one of said variable wheel slip threshold and said variable time period for extended wheel slippage to higher values based on said vehicle speed or a combination of said vehicles speed and lateral acceleration.

3. An electronic control device for controlling the brakes of a wheeled vehicle, wherein said brakes are controlled by an anti-lock brake system and wherein said anti-lock brake system includes a normal driving conditions mode and an off-road driving conditions mode, and wherein said brake system is operating in the off-road driving conditions mode, comprising:
    (a) one or more inputs for receiving signals from a plurality of sensors for use by said electronic control device to determine wheel speed, wheel retardation, and wheel acceleration;
    (b) a primary control logic for modulating brake pressure during time periods under normal vehicle operating conditions;
    (c) a secondary control logic for modulating brake pressure under off-road vehicle operating conditions when the off-road mode has been activated; and
    (d) a processing unit that calculates a vehicle reference speed and a wheel slip of each sensed and anti-lock brake system controlled wheel,
    wherein said processing unit controls at least one of the individual wheel slip and the time period for an extended wheel slippage based on a signal indicative of said vehicle actual lateral acceleration and calculates said vehicle lateral acceleration when said vehicle is taking a curve by measuring the speed of the wheels on the inside of said curve and the speed of the wheel on the outside of said curve and determining the speed difference ($\Delta V$) of the non-driven wheels as measured by said sensors and calculating lateral acceleration based on said vehicle reference speed and the wheel track width of the vehicle non-driven wheels.

4. The control device of claim 3 wherein at least one of said individual wheel slip and time period for an extended wheel slippage are progressively or linearly dependant on said vehicle lateral acceleration.

5. An anti-lock brake controller for controlling the brakes of a wheeled vehicle, wherein said wheeled vehicle has a normal driving conditions mode and an off-road driving conditions mode, and wherein said vehicle is operating in the off-road driving conditions mode, the controller comprising:
    (a) one or more inputs for receiving signals from a plurality of sensors to determine wheel speed, wheel retardation, and wheel acceleration;
    (b) a primary control logic for modulating brake pressure during time periods under normal vehicle operating conditions;
    (c) a secondary control logic for modulating brake pressure under off-road vehicle operating conditions when the off-road mode has been activated; and
    (d) a processing unit that calculates a vehicle reference speed and a wheel slip of each sensed and controlled wheel, wherein said processing unit calculates at least one of a variable wheel slip threshold and a variable time period for an extended wheel slippage based on the actual difference in speed of the wheels on a non-driven axle and controls at least one of the individual wheel slip and the time period for an extended wheel slippage as a function of at least one of the variable wheel slip threshold and the variable time period for an extended wheel slippage.

6. The controller of claim 5 wherein said processing unit progressively changes at least one of said individual wheel slip threshold and said time period for extended wheel slippage to higher values based on said vehicle speed or a combination of said vehicle speed and lateral acceleration.

7. The controller of claim 5 wherein said sensors measure, as the vehicle is driving in a curve, the speed of the wheels on the inside of the curve and the speed of the wheel on the outside of the curve, and wherein the processing unit determines the speed difference ($\Delta V$) of the non-driven wheels as measured by said sensors.

8. The controller of claim 5 wherein at least one of said individual wheel slip and time period for an extended wheel slippage are progressively or linearly dependant on lateral acceleration of said vehicle.

* * * * *